(12) United States Patent
Otashiro

(10) Patent No.: US 7,591,757 B2
(45) Date of Patent: Sep. 22, 2009

(54) SHIFT LEVER DEVICE

(75) Inventor: Naoki Otashiro, Aichi-ken (JP)

(73) Assignee: Kabushiki Kaisha Tokai-Rika-Denki-Seisakusho, Aichi-ken (JP)

(*) Notice: Subject to any disclaimer, the term of this patent is extended or adjusted under 35 U.S.C. 154(b) by 454 days.

(21) Appl. No.: 11/612,939

(22) Filed: Dec. 19, 2006

(65) Prior Publication Data

US 2007/0144295 A1    Jun. 28, 2007

(30) Foreign Application Priority Data

Dec. 22, 2005    (JP)    ............................. 2005-370408

(51) Int. Cl.
*B60W 10/00*    (2006.01)
(52) U.S. Cl. ..................... 477/96; 74/335; 74/473.21; 192/220.3
(58) Field of Classification Search ............... 74/335, 74/337.5, 473.1, 473.15, 473.18, 473.21, 74/473.24, 473.25, 473.26, 473.28, 473.33; 477/94, 96, 99, 101, 211; 192/220, 220.2, 192/220.3
See application file for complete search history.

(56) References Cited

U.S. PATENT DOCUMENTS

| | | | | |
|---|---|---|---|---|
| 5,996,763 A | * | 12/1999 | Tsuge | ...................... 192/220.3 |
| 6,082,217 A | * | 7/2000 | Wheeler | .................... 74/483 R |
| 7,124,874 B2 | * | 10/2006 | Wang | ...................... 192/220.4 |

FOREIGN PATENT DOCUMENTS

JP    2003-127695 A    5/2003

* cited by examiner

*Primary Examiner*—David D. Le
(74) *Attorney, Agent, or Firm*—Roberts Mlotkowski Safran & Cole, P.C.; Thomas W. Cole

(57) ABSTRACT

A shift lever device for transmission operation of a vehicle has a shift lever, a locking member, a withdrawing member and a biasing member. When force is applied to the shift lever due to transmission operation of the shift lever by a vehicle occupant, the withdrawing member is pushed, and, due to a component of force thereof, is withdrawn from a path of movement for transmission operation of the shift lever. When the locking member is set in a movement limited state due to operation of the vehicle occupant, the locking member impedes movement of the shift lever due to transmission operation. When the locking member is set in a movable state, the locking member as well is, by a torsion spring, interlocked with the withdrawing member and withdrawn from the path of movement of the shift lever.

8 Claims, 8 Drawing Sheets

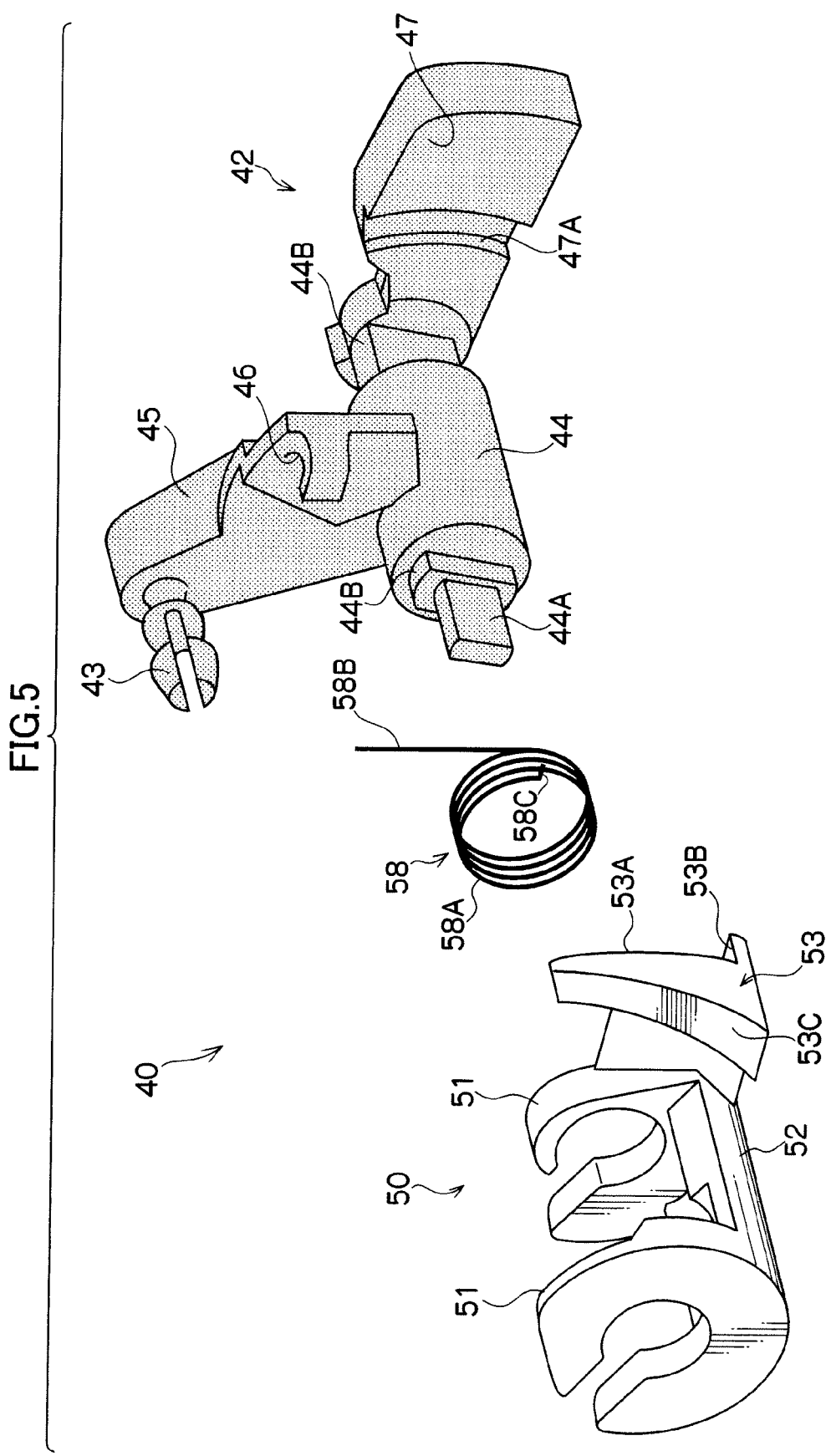

SHIFT LEVER DEVICE

CROSS-REFERENCE TO RELATED APPLICATION

This application claims priority under 35 USC 119 from Japanese Patent Application 2005-370408, the disclosure of which is incorporated by reference herein.

BACKGROUND OF THE INVENTION

1. Field of the Invention

The present invention relates to a shift lever device which can change the shift position of a shift lever.

2. Description of the Related Art

In a mechanical-type shift locking mechanism used in a shift lever device (see, for example, Japanese Patent Application Laid-Open (JP-A) No. 2003-127695), pivoting of a shift lever is set in an impeded state or an allowed state due to a stopper link, which is a locking member, being moved to a locking position or an unlocking position by the urging force of a biasing member.

In this conventional shift locking mechanism, the urging force of the biasing member must be set appropriately in consideration of both the ability to move and operate the shift lever from the "P" shift position and the ability to move and operate the shift lever to the "P" shift position, which makes designing and manufacturing difficult.

SUMMARY OF THE INVENTION

In view of the aforementioned, the present invention provides a shift lever device which is easy to design and manufacture.

A shift lever device of a first aspect of the present invention has: a shift lever which can change a shift position; a locking member switched, by operation of a vehicle occupant, between a movable state and a movement limited state, and, in the movement limited state, the locking member is disposed at an impeding position at which the locking member impedes transmission operation movement of the shift lever; a withdrawing member attached to the locking member so as to be able to move relative thereto, the withdrawing member being pushed by the transmission operation movement of the shift lever, and, due to a component of force thereof, being withdrawn from a path of the transmission operation movement of the shift lever; and a biasing member provided between the locking member and the withdrawing member, and, in a state in which the locking member is in the movable state and the shift lever is moved for transmission operation, the biasing member interlocks the locking member with the withdrawing member and causes the locking member to withdraw from the path of the transmission operation movement of the shift lever.

In accordance with the shift lever device of the first aspect of the present invention, in a case in which the locking member is set in the movement limited state by operation of a vehicle occupant, and force of the transmission operation movement is applied to the shift lever, the withdrawing member is pushed by the transmission operation movement of the shift lever, and due to a component of force thereof, is withdrawn from the path of the transmission operation movement of the shift lever, and the locking member impedes the transmission operation movement of the shift lever. On the other hand, in a case in which the locking member is set in the movable state by operation of the vehicle occupant, and force of the transmission operation movement is applied to the shift lever, the withdrawing member is pushed by the transmission operation movement of the shift lever, and due to a component of force thereof, is withdrawn from the path of the transmission operation movement of the shift lever, and, together therewith, the locking member is, by the biasing member, interlocked with the withdrawing member and withdrawn from the path of the transmission operation movement of the shift lever. In this way, the biasing member is only provided in order to interlock the locking member and the withdrawing member. Therefore, setting of the urging force of the biasing member is easy, and design and manufacturing of the shift lever device are easy.

The shift lever device of the first aspect of the present invention may be structured such that the withdrawing member is attached to the locking member so as to be able to rotate and move coaxially, and the biasing member is supported at the locking member and urges the withdrawing member in an opposite direction of a direction in which the withdrawing member is withdrawn from a path of the transmission operation movement of the shift lever, and, in a state in which the shift lever is at a "P" shift position, a portion of the withdrawing member is disposed on the path of the transmission operation movement of the shift lever.

In accordance with the shift lever device of the above-described structure, the biasing member is supported at the locking member, and urges the withdrawing member in the opposite direction as the direction in which the withdrawing member is withdrawn from the path of the transmission operation movement of the shift lever. In a case in which the locking member is set in the movement limited state by operation of the vehicle occupant, and force of transmission operation movement is applied to the shift lever which is at the "P" shift position, when this force becomes greater than the urging force of the biasing member, the withdrawing member is rotated and moved by a pushing component of force due to the transmission operation movement of the shift lever, and is withdrawn from the path of the transmission operation movement of the shift lever. At this time, the locking member impedes the transmission operation movement of the shift lever.

On the other hand, in a case in which the locking member is set in the movable state by operation of the vehicle occupant, and force of transmission operation movement is applied to the shift lever which is at the "P" shift position, the withdrawing member is pushed by the transmission operation movement of the shift lever, and is rotated and moved by a component of force thereof, and is withdrawn from the path of the transmission operation movement of the shift lever. At this time, due to the biasing member, the locking member, being interlocked with the withdrawing member, rotates and moves, and is withdrawn from the path of the transmission operation movement of the shift lever.

In the shift lever device of the first aspect of the present invention, the withdrawing member may have an inclined surface which is pushed by the transmission operation movement of the shift lever.

In accordance with the shift lever device of the above-described structure, when the shift lever is moved for transmission operation, the inclined surface is pushed by a portion of the shift lever, and, due to a component of force thereof, the withdrawing member is withdrawn from the path of the transmission operation movement of the shift lever.

As described above, in accordance with the shift lever device of the present invention, there is the excellent effect that designing and manufacturing can be made to be easy.

BRIEF DESCRIPTION OF THE DRAWINGS

FIG. 5 is an exploded perspective view showing the locking unit in the exemplary embodiment of the present invention;

FIGS. 6A and 6B are drawings showing the locking unit in a state in which a shift lever is at a "P" shift position in the exemplary embodiment of the present invention, wherein FIG. 6A is a side view (a projecting portion of the shift lever is shown by the imaginary line), and FIG. 6B is a view in the direction of arrows 6B-6B of FIG. 6A (the projecting portion of the shift lever is shown in a cut section);

FIGS. 7A and 7B are drawings showing the locking unit in a case in which the shift lever is in a shift-locked state in the exemplary embodiment of the present invention, wherein FIG. 7A is a side view (the projecting portion of the shift lever is shown by the imaginary line), and FIG. 7B is a view in the direction of arrows 7B-7B of FIG. 7A (the projecting portion of the shift lever is shown in a cut section); and FIGS. 8A and 8B are drawings showing the locking unit with the shift lever being in a shift-lock-released state in the exemplary embodiment of the present invention, wherein FIG. 8A is a side view (the projecting portion of the shift lever is shown by the imaginary line), and FIG. 8B is a view in the direction of arrows 8B-8B of FIG. 8A (the projecting portion of the shift lever is shown in a cut section).

DETAILED DESCRIPTION OF THE INVENTION

Figure 1:
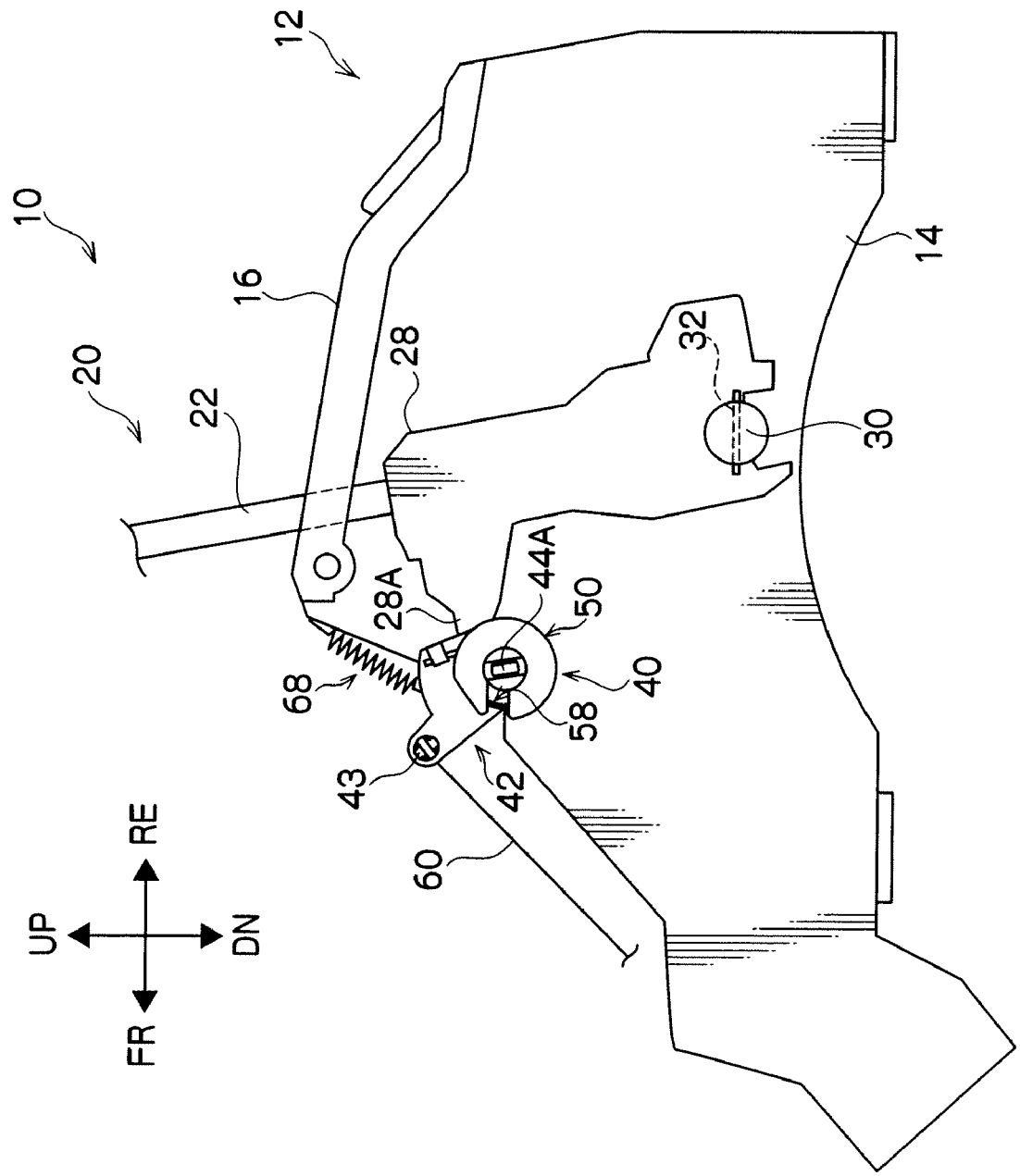
FIG. 1 is a side view showing the schematic structure of a shift lever device relating to an exemplary embodiment of the present invention.

An exemplary embodiment of a shift lever device of the present invention will be described on the basis of the drawings. Note that, in the drawings, arrow UP indicates the upward direction of a vehicle, arrow DN indicates the downward direction of the vehicle, arrow FR indicates the forward direction of the vehicle, arrow RE indicates the rearward direction of the vehicle, and arrow W indicates the transverse direction of the vehicle.

Figure 2:
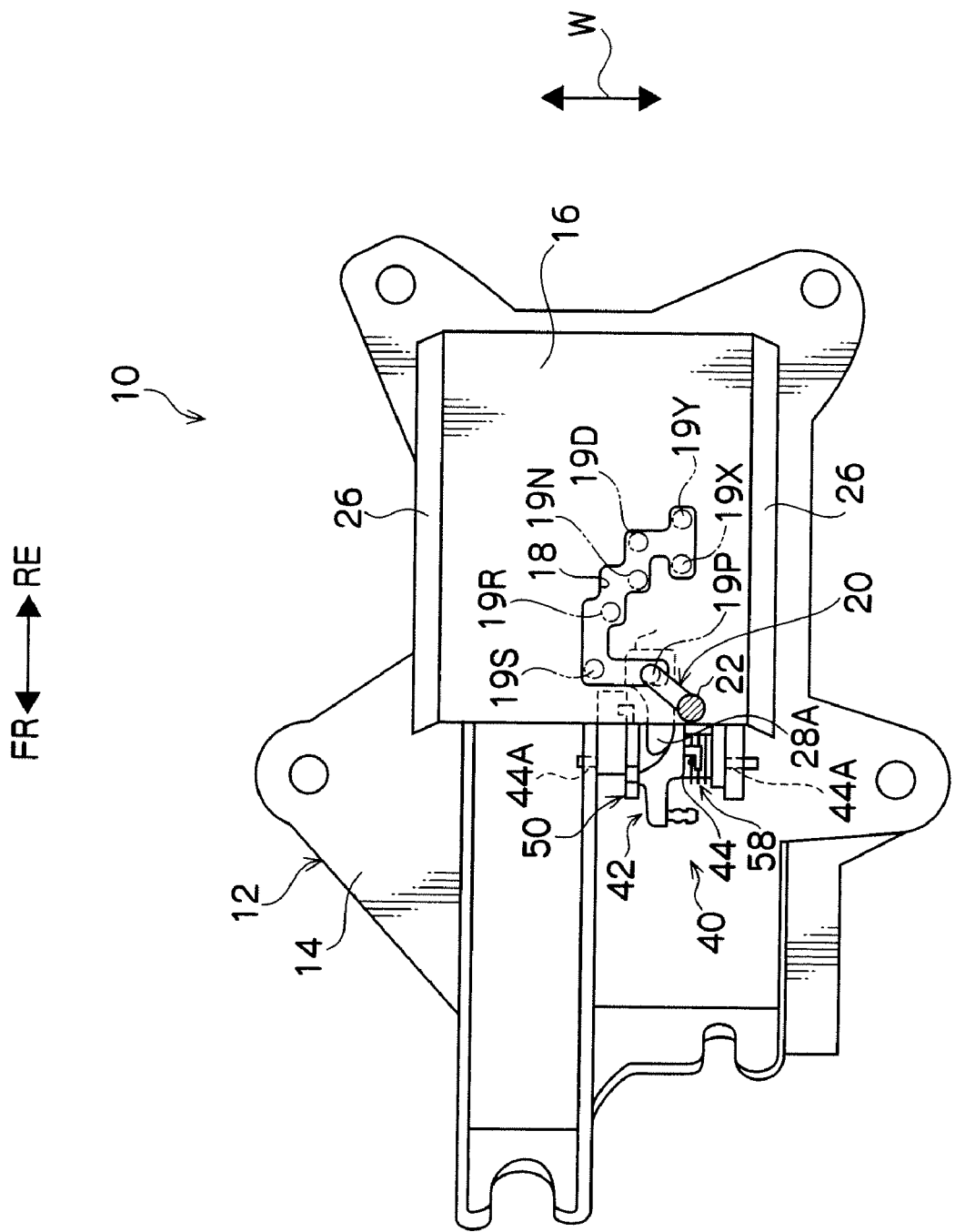
FIG. 2 is a plan view showing the schematic structure of the shift lever device relating to the exemplary embodiment of the present invention.

As shown in FIG. 1, a shift lever device 10 has a housing 12. The housing 12 is disposed at a predetermined position at the front side of a vehicle, between the driver's seat and the front passenger's seat. A base portion 14 of the housing 12 is fixed to a predetermined region of the vehicle body by a fastening means or the like such as bolts or the like. The housing has a top wall 16 serving as a partitioning member. As shown in FIG. 2, a guide hole 18, which is bent so as to zigzag upward, downward, leftward and rightward in plan view, is formed in the top wall 16 so as to pass therethrough.

A lever portion 22 structuring a shift lever 20 passes through the guide hole 18. The shift lever 20 can change the shift position. Due to the shift lever 20 being guided by the guide hole 18 from a "P" shift position 19P, for the time when the vehicle is parked, and pivoted in the longitudinal direction of the vehicle (in the direction of arrow FR-RE) and the left-right direction of the vehicle (the direction of arrow W), i.e., due to the shift lever 20 being moved so as to operate the transmission (moved for a selecting operation and moved for a shifting operation), the shift lever 20 is changed to another shift position (in the present exemplary embodiment, an "R" shift position 19R for driving the vehicle rearward, an "N" shift position 19N for a neutral state, a "D" shift position 19D for driving the vehicle forward, and a "+" shift position 19X and a "−" shift position 19Y for a manual mode). Here, when the shift lever 20 is changed from the "P" shift position 19P to the "R" shift position 19R, the shift lever 20 must be pivoted in the order of toward the right of the vehicle (toward the side in a predetermined direction (the selecting direction)), toward the rear of the vehicle (the direction of arrow RE), and toward the left of the vehicle.

As shown in FIGS. 1 and 2, the lever portion 22 is formed in the shape of a rod having a circular cross-section, and an operation knob 23 (see FIG. 3) is fixed integrally to the top portion of the distal end of the lever portion 22. The shift lever 20 can change the shift position by a vehicle occupant operating the operation knob 23 (see FIG. 3). The proximal end side of the lever portion 22 passes through the guide hole 18, and enters-in between a pair of side walls 26 structuring the housing 12. A retainer 28, which is fixed to the lever portion 22 and which structures the shift lever 20, is provided between these side walls 26.

As shown in FIG. 1, the retainer 28 is formed in the shape of a block which is long along the longitudinal direction of the lever portion 22. The lower portion of the retainer 28 is bifurcated, and is supported by a shaft 30 whose axial direction is substantially the transverse direction of the vehicle. In this way, the retainer 28 can rotate and move around the shaft 30. At the same time, the retainer 28 is mounted to the shaft 30 by a shaft 32, which extends substantially in the longitudinal direction of the vehicle and is supported at the shaft 30, so as to be able to rotate and move around the shaft 32. In this way, movement of the shift lever 20 for the selecting operation is possible.

Figure 4:
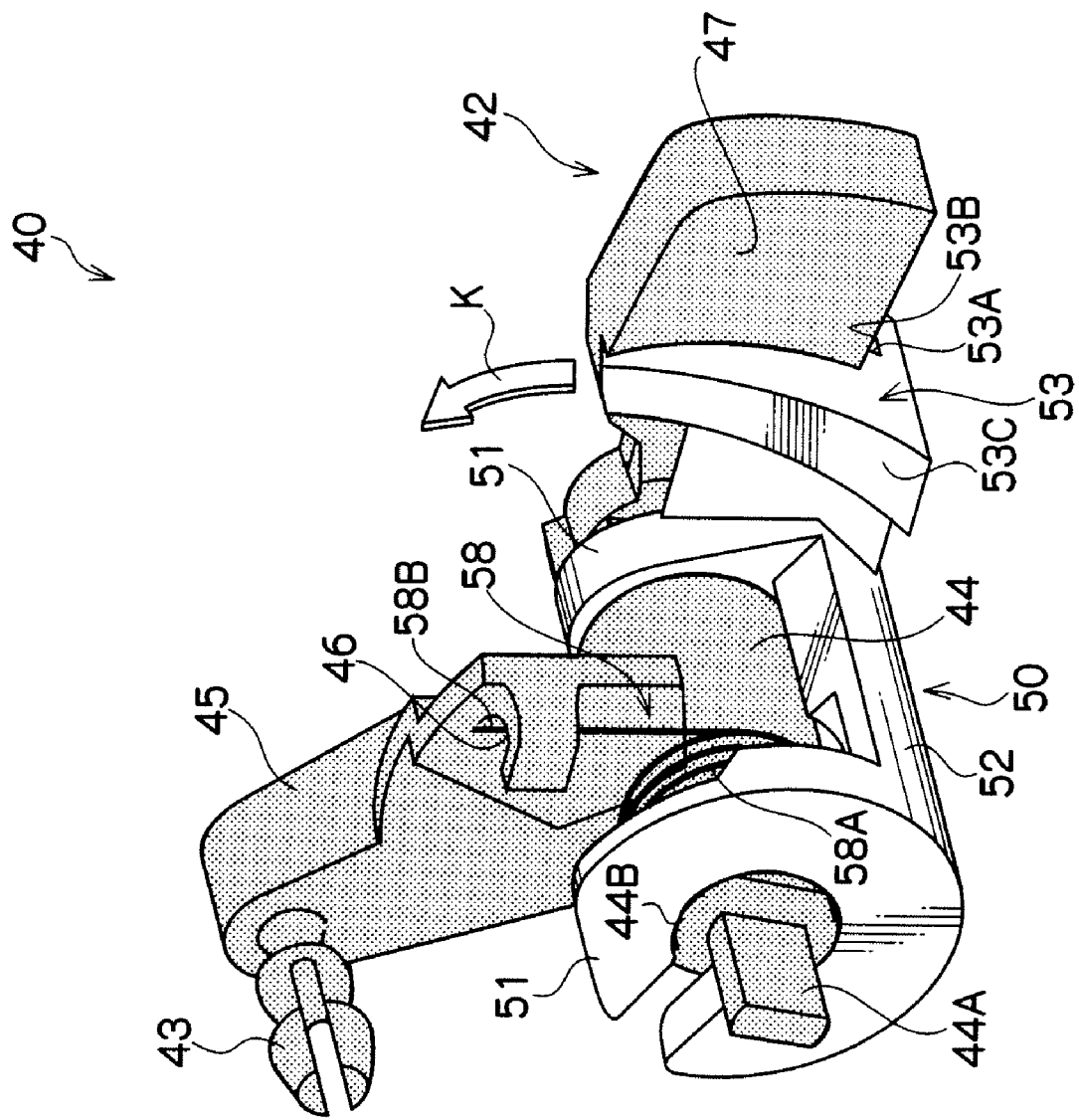
FIG. 4 is a perspective view showing a locking unit in the exemplary embodiment of the present invention.

The vehicle front side (arrow FR direction side) of the upper portion of the retainer 28 has a projecting portion 28A which projects-out in a beak-like shape. The projecting portion 28A can contact a locking unit 40. As shown in FIGS. 4 and 5, the locking unit 40, details of which will be described later, has a locking member 42, a withdrawing member 50, and a torsion spring 58 serving as a biasing member. As shown in FIG. 1, one end of a cable 60 is anchored on an anchor portion 43 of the locking member 42.

Figure 3:
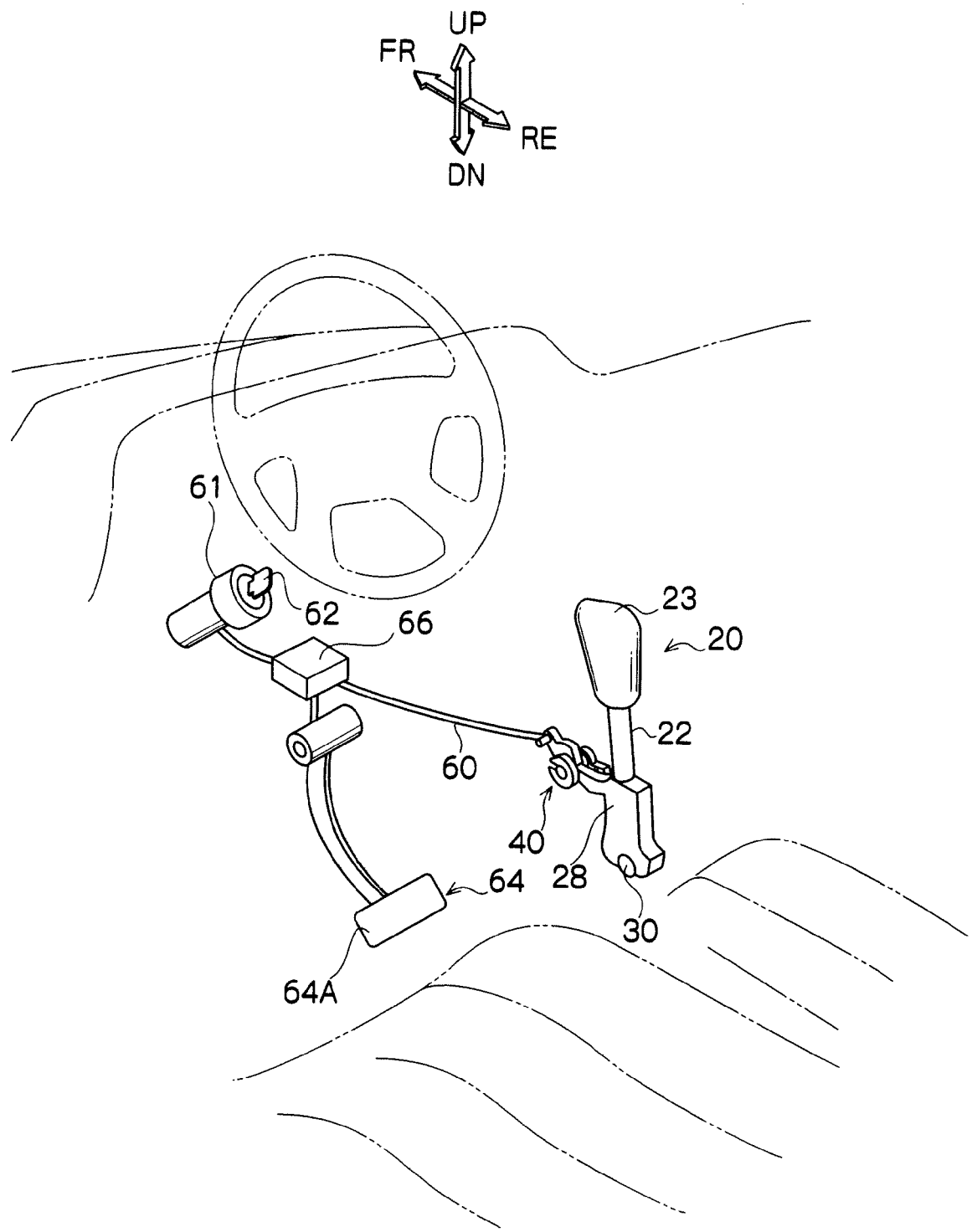
FIG. 3 is a schematic structural view showing a connected state of a cable in the exemplary embodiment of the present invention.

As shown in FIG. 3, the cable 60 is led into a box 66 which is disposed substantially above a brake pedal 64A. Within the box 66, movement of the cable 60 is limited and the limiting of the movement of the cable 60 is released in accordance with the operation of an ignition key 62 and the operation of a brake 64. Namely, the cable 60 is switched between a limited state in which movement thereof is limited when the ignition key 62 is in an off state or the brake 64 is in a non-operated state, and a released state in which limiting of movement is released when the ignition key 62 is in an on state and the brake 64 is in an operated state. Accordingly, the cable 60 can move in a case in which, for example, the brake pedal 64A is depressed and the ignition key 62 inserted in a key cylinder 61 is rotated from a lock position to an on position. Movement of the cable 60 is limited in a case in which the brake pedal 64A is not depressed, or in a case in which the ignition key 62 remains as is at the lock position.

Here, due to the cable 60 entering into the released state, the locking member 42 (see FIG. 4) also becomes able to rotate freely. Further, in the state in which the locking unit 40 which has the locking member 42 is rotated by the shift lever 20, i.e., the state in which the shift lever 20 is moved to other than the "P" shift position, the ignition key 62 is in a state in which it cannot be pulled-out.

Note that a known mechanism can be used for the mechanism which switches the cable 60 between the limited state and the released state.

As shown in FIG. 5, the locking member 42 structuring the locking unit 40 has a cylindrical portion 44 which is shaped as a solid cylinder. An arm portion 45 projects-out in the radial direction from the axial direction central portion of the cylindrical portion 44. The anchor portion 43, which is for anchoring the cable 60 (see FIG. 1), is provided at the distal end portion of the arm portion 45. Shaft portions 44A, which are substantially shaped as rectangular columns, extend-out toward the axial direction outer sides from the both end portion sides in the axial direction of the cylindrical portion 44. As shown in FIG. 2, the locking member 42 is disposed such that the axial center of the cylindrical portion 44 is along the transverse direction of the vehicle (the direction of arrow W), and the shaft portions 44A are rotatably supported at portions of the housing 12. Therefore, when the cable 60 shown in FIG. 1 is switched between the limited state and the released state due to operation of the vehicle occupant, interlockingly therewith, the locking member 42 is switched between a movement limited state (a state in which movement thereof is limited) and a movable state (a state in which movement thereof is possible). Further, the axial direction of the shaft portions 44A is orthogonal to the axial direction of the shaft 32 for movement for the selecting operation.

One end portion of an auxiliary spring 68, which serves as a tension coil spring and which has a small urging force, is attached to the locking member 42. The other end portion of the auxiliary spring 68 is attached to the top portion of the housing 12. The auxiliary spring 68 urges the locking member 42 obliquely upward by a small urging force, such that the locking unit 40 including the locking member 42 does not rotate needlessly in a state of vibrating while the vehicle is traveling.

As shown in FIG. 5, the axial direction both sides of the cylindrical portion 44 are step portions 44B which are step-shaped substantial rectangular parallelepipeds. Attachment portions 51 of the withdrawing member 50 can be attached to these step portions 44B. The pair of attachment portions 51 are substantially C-shaped in side view, and are connected together by a connecting portion 52, and can fit-in such that portions of the inner peripheral portions of the substantial C-shapes are supported at the step portions 44B. In this way, as shown in FIG. 4, the withdrawing member 50 is attached to the locking member 42 so as to be able to coaxially rotate and move (i.e., so as to be able to move relative to the locking member 42).

A coil portion 58A of a torsion spring 58 is wound on the outer periphery of the cylindrical portion 44 shown in FIGS. 4 and 5. One end portion 58B of the torsion spring 58 is anchored on a spring anchor portion 46 which projects-out from the arm portion 45 of the locking member 42. Another end portion 58C of the torsion spring 58 is anchored on a spring anchor portion (not shown) which is formed at the connecting portion 52 of the withdrawing member 50. Namely, the torsion spring 58, which is provided between the locking member 42 and the withdrawing member 50, is supported at the locking member 42, and urges the withdrawing member 50 in the counterclockwise direction in FIG. 4 (the direction of arrow K).

Figure 6A:
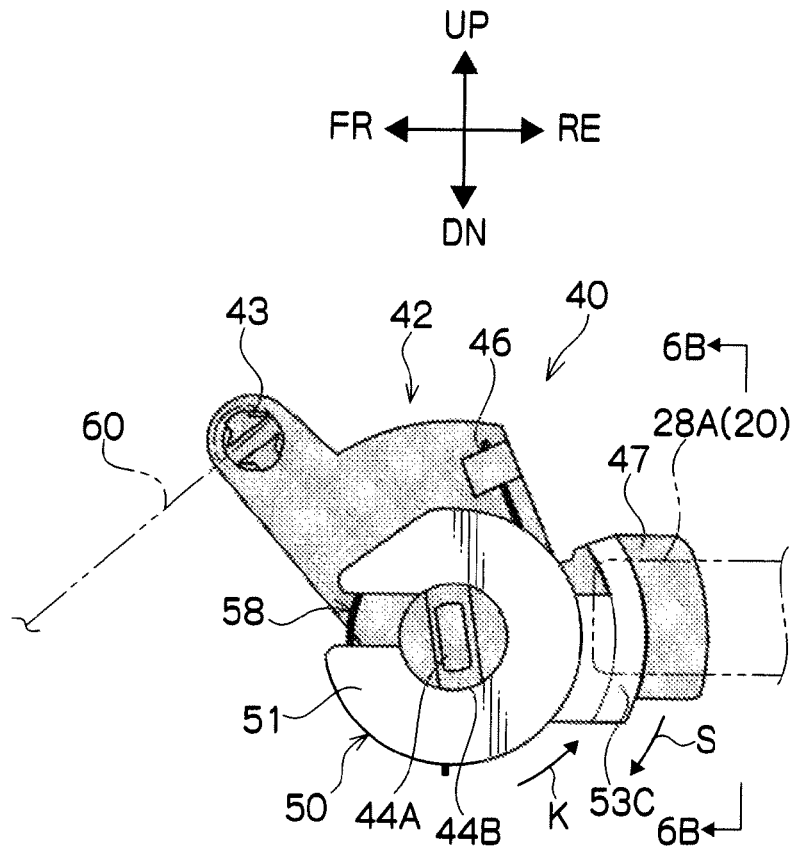
Figure 6B:
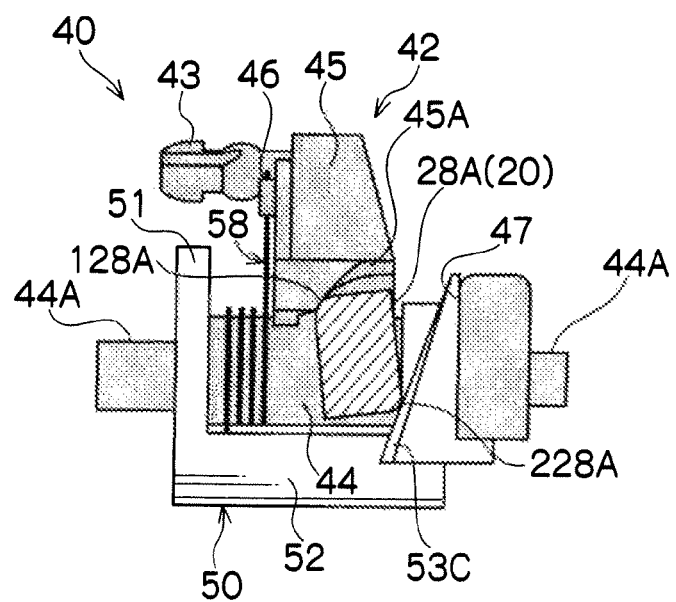

As shown in FIG. 6B, an inclined surface 45A is formed at the base portion of the arm portion 45 at the reverse side (the right side in FIG. 6B) of the spring anchor portion 46. This inclined surface 45A is formed by being cut-out so as to obliquely and arcuately traverse the outer periphery which is slightly removed from the cylindrical portion 44. In the state (the state shown in FIG. 6B) in which the shift lever 20 is at the "P" shift position 19P (see FIG. 2), a top portion abutting portion 128A of the projecting portion 28A at the shift lever 20 abuts the inclined surface 45A. The top portion abutting portion 128A is curved in a rounded shape. When the shift lever 20 is returned to the "P" shift position 19P (see FIG. 2, the position shown in FIG. 6B), the top portion abutting portion 128A pushes the inclined surface 45A. In this way, the locking member 42 rotates around the shaft portions 44A due to a component of force of the pushing force of the shift lever 20 (the top portion abutting portion 128A). Due to the torsion spring 58, the withdrawing member 50 as well is made integral with the locking member 42 and rotates.

Here, in the state in which the cable 60 shown in FIG. 3 is pulled toward the shift lever 20 side, i.e., in the state in which the shift lever 20 is other than at the "P" position, the ignition key 62 is locked by a locking mechanism (not shown) such that the ignition key 62 cannot rotate from the on position to the off position. In this locked state, the ignition key 62 cannot be pulled-out. However, due to the shift lever 20 being moved to the "P" position, the inclined surface 45A shown in FIG. 6B is pushed by the top portion abutting portion 128A and the locking unit 40 is returned to the initial position, and the cable 60 (see FIG. 6A) as well is thereby returned to the initial position. Therefore, the ignition key 62 shown in FIG. 3 is set in the state in which it can rotate from the on position to the off position, and the ignition key 62 can be removed.

Figure 7A:
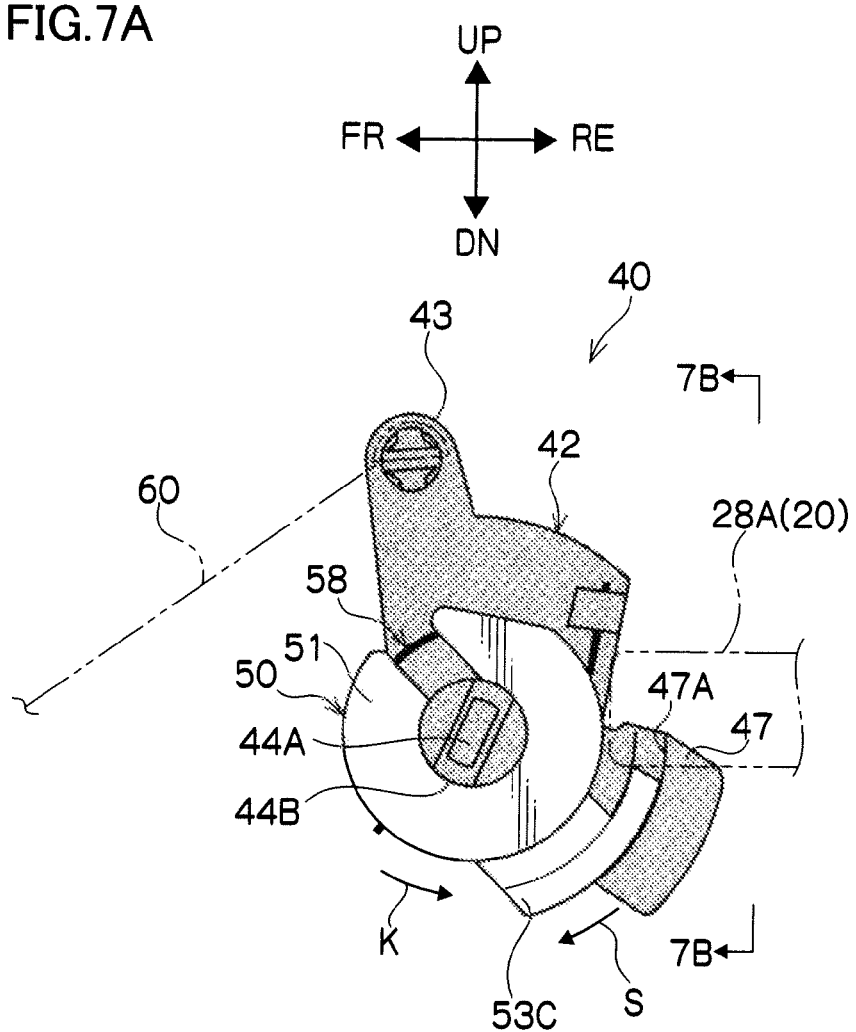
Figure 7B:
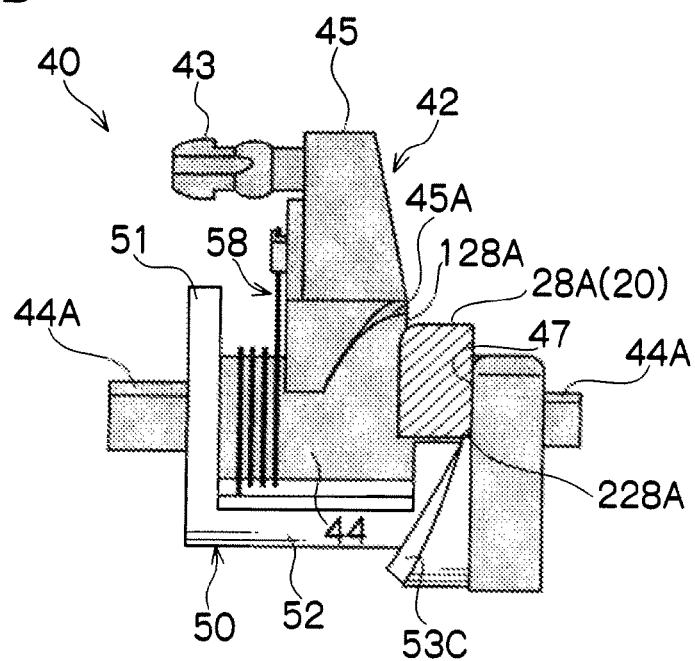

As shown in FIG. 5, near one side end portion in the axial direction of the cylindrical portion 44 (near the right side in FIG. 5), a wall portion 47 which is orthogonal to the axial direction of the cylindrical portion 44 projects-out. The direction in which the wall portion 47 projects-out does not coincide with the direction in which the arm portion 45 projects-out, and, in the present exemplary embodiment, the angle in side view (see FIG. 6A) formed by the wall portion 47 and the arm portion 45 is an obtuse angle. As shown in FIGS. 7A and 7B, in the movement limited state of the locking member 42, the wall portion 47 is disposed on the path of movement of the projecting portion 28A of the shift lever 20, i.e., is disposed at an impeding position at which the wall portion 47 impedes the transmission operation movement of the shift lever 20, and shifting is thereby locked.

In the present exemplary embodiment, so-called play of the cable 60 is taken into consideration. Even if there is play of a predetermined amount (e.g., 10.2 mm) which can be supposed in advance at the cable 60, it is set such that the wall portion 47 is disposed on the path of movement of the projecting portion 28A of the shift lever 20 in the movement limited state of the locking member 42 which accompanies the limited state of the cable 60.

As shown in FIG. 5, an arc-shaped groove 47A is formed in the wall portion 47 of the locking member 42, in the side thereof at which the withdrawing member 50 is disposed. In the state in which the withdrawing member 50 is attached to the locking member 42 as shown in FIG. 4, a portion (a sliding portion 53A (see FIG. 5)) of a block portion 53 of the withdrawing member 50 can slide in the groove 47A. As shown in FIG. 5, the block portion 53 is a projecting-out portion which extends-out, from one of the attachment portions 51 of the withdrawing member 50, in a direction orthogonal to the rotational center of the withdrawing member 50. A stopper portion 53B, which projects-out substantially orthogonally with respect to the sliding surface of the sliding portion 53A, is formed beneath the sliding portion 53A. The withdrawing member 50, which is urged by the torsion spring 58, is positioned due to the stopper portion 53B hitting the bottom surface of the wall portion 47 of the locking member 42.

An inclined surface 53C is formed at the opposite side surface of the sliding portion 53A. As shown in FIGS. 6A and 6B, due to the shift lever 20 being moved so as to operate the transmission, a lower portion abutting portion 228A of the projecting portion 28A at the shift lever 20 hits the inclined surface 53C of the withdrawing member 50, and the inclined surface 53C is pushed thereby As shown in FIGS. 7A and 7B, due to a component of force of this pushing force, the withdrawing member 50, while rotating, is withdrawn from the path of the transmission operation movement of the shift lever 20 (the path over which the shift lever 20 moves and operates the transmission). The lower portion abutting portion 228A is curved in a rounded shape.

Here, the torsion spring 58 is supported at the locking member 42, and urges the withdrawing member 50 in the opposite direction (the direction of arrow K) of the direction of being withdrawn from the path of the transmission operation movement of the shift lever 20 (the direction of arrow S). In the state in which the shift lever 20 is at the "P" shift position 19P (the shift position shown in FIG. 2) as shown in FIG. 2, a portion of the withdrawing member 50 (the block portion 53 having the inclined surface 53C shown in FIG. 4) is disposed on the path of the transmission operation movement of the projecting portion 28A of the retainer 28 of the shift lever 20 shown in FIG. 2.

Figure 8A:
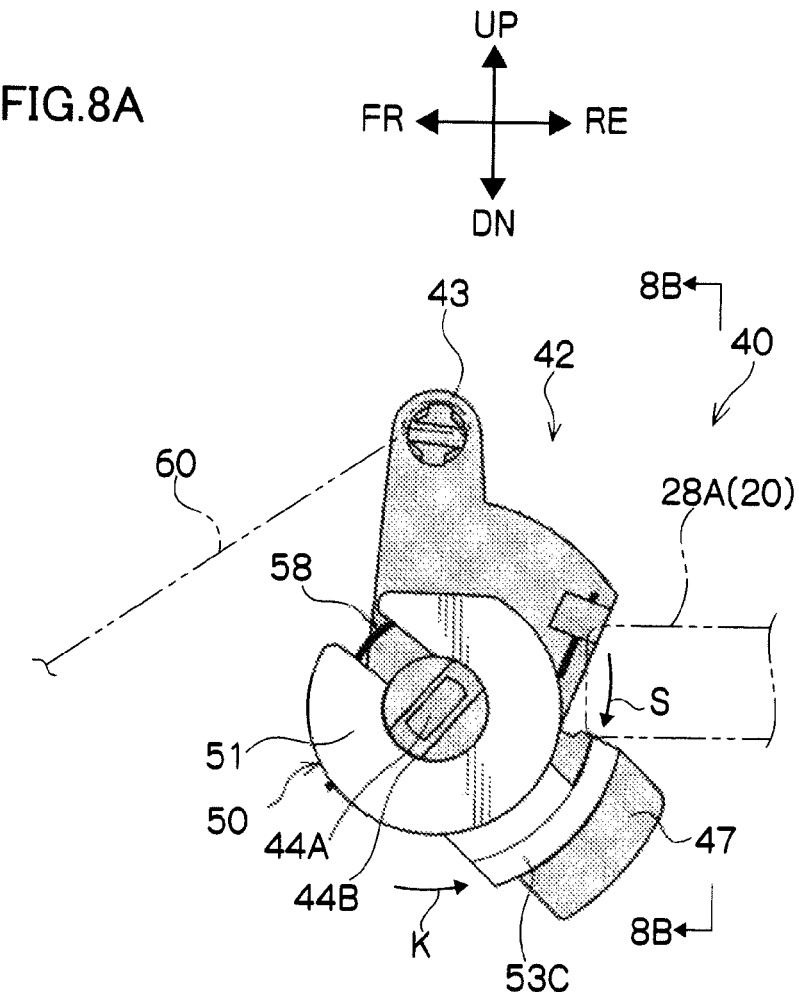
Figure 8B:
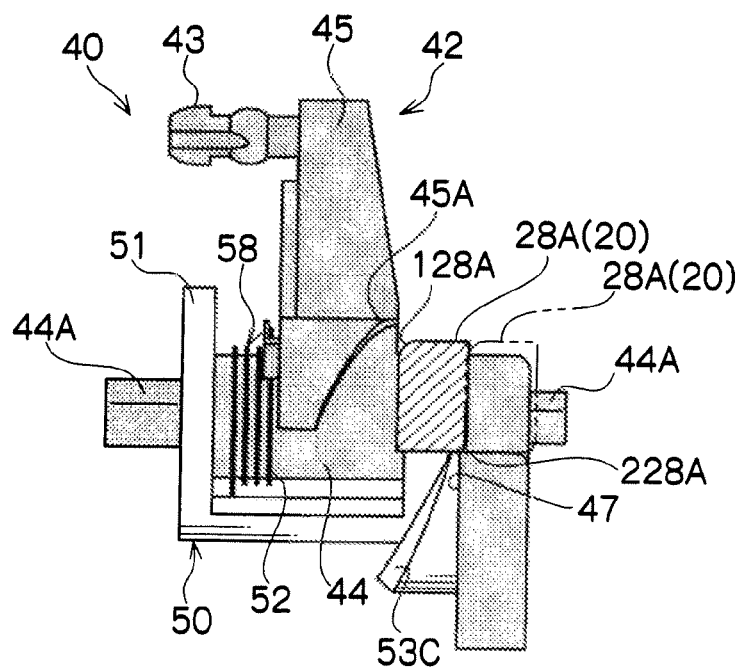

Therefore, in the state in which the locking member 42 is movable (the released state of the cable 60 shown in FIG. 1) and the shift lever 20 is moved so as to operate the transmission, as shown in FIGS. 8A and 8B, the torsion spring 58 interlocks the locking member 42 with the withdrawing member 50 and causes the locking member 42 to withdraw from the path of the transmission operation movement of the projecting portion 28A of the shift lever 20, and locking is thereby released.

Note that, in the state in which the shift lever 20 is selection-operated from the "P" shift position 19P shown in FIG. 2, the shift lever 20 is disposed at the position indicated by reference numeral 19S in FIG. 2, and, as shown by the imaginary line in FIG. 8B, the projecting portion 28A of the shift lever 20 is disposed above the wall portion 47.

Operation of the above exemplary embodiment will be described next.

Due to operation of a vehicle occupant, in a case in which the brake pedal 64A shown in FIG. 3 is not depressed or in a case in which the ignition key 62 is left at the lock position as is, movement of the cable 60 is limited, and the locking member 42 shown in FIG. 1 is thereby in a movement limited state.

In a case in which the locking member 42 is in the movement limited state and force of the transmission operation movement is applied by the selecting operation to the shift lever 20 which is at the "P" shift position 19P (see FIG. 2), when this force becomes greater than the urging force of the torsion spring 58, the inclined surface 53C of the withdrawing member 50 is pushed by the projecting portion 28A due to the transmission operation movement of the shift lever 20, as shown in FIGS. 6A and 6B. Due to a component of force of this pushing, the withdrawing member 50 is rotated and moved, and, as shown in FIGS. 7A and 7B, is withdrawn from the path of the transmission operation movement of the projecting portion 28A of the shift lever 20. At this time, the wall portion 47 of the locking member 42 impedes the transmission operation movement of the projecting portion 28A of the shift lever 20. Shifting is thereby locked.

Note that, in a case in which there is play in the cable 60, the locking member 42 and the withdrawing member 50 are made integral and rotate due to the torsion spring 58, within the range of this play and with respect to the transmission operation movement of the shift lever 20. However, when the range of play of the cable 60 is exceeded, the movement limited state of the locking member 42 arises. Therefore, as described previously, only the withdrawing member 50 rotates, and the wall portion 47 of the locking member 42 impedes the transmission operation movement of the projecting portion 28A of the shift lever 20.

On the other hand, in a case in which, due to operation of a vehicle occupant, the brake pedal 64A shown in FIG. 3 is depressed and the ignition key 62 inserted in the key cylinder 61 is rotated from the lock position to the on position, the limiting of the movement of the cable 60 is released, and the locking member 42 shown in FIG. 1 is thereby set in a movable state.

In a case in which the locking member 42 is in the movable state and force of the transmission operation movement is applied by the selecting operation to the shift lever 20 which is at the "P" shift position 19P (see FIG. 2), as shown in FIGS. 6A and 6B, the withdrawing member 50 is pushed by the transmission operation movement of the projecting portion 28A of the shift lever 20, and, as shown in FIGS. 8A and 8B, is rotated and moved by a component of force thereof In this way, the withdrawing member 50 is withdrawn from the path of the transmission operation movement of the projecting portion 28A of the shift lever 20, and, together therewith, the locking member 42 is, by the torsion spring 58, interlocked with the withdrawing member 50 and rotated and moved, so as to be withdrawn from the path of the transmission operation movement of the projecting portion 28A of the shift lever 20. In this way, the selecting operation becomes possible, and, after the selecting operation, the shifting operation is carried out.

Further, in a case in which the shift lever 20 is returned to the "P" shift position 19P (see FIG. 2), the inclined surface 45A of the locking member 42 is pushed by the top portion abutting portion 128A of the projecting portion 28A at the shift lever 20 shown in FIG. 8B. Therefore, due to a component of force thereof, the locking member 42 is rotated around the shaft portions 44A, the locking member 42 is returned to the position shown in FIGS. 6A and 6B, and the withdrawing member 50 as well is, by the torsion spring 58, interlocked with the locking member 42 and returned to the initial position (the position shown in FIGS. 6A and 6B). Further, at this time, because the cable 60 as well is returned to the initial position, the ignition key 62 shown in FIG. 3 is set in a state in which it can be rotated from the on position to the off position, and the ignition key 62 can be pulled-out.

As described above, in the locking unit 40 of the shift lever device 10 of the present exemplary embodiment, the torsion spring 58 which serves as the biasing member is only provided at one place in order to interlock the locking member 42 and the withdrawing member 50. Therefore, the setting of the urging force of the torsion spring 58 which serves as the biasing member is easy, and the designing and manufacturing of the shift lever device 10 are easy.

Note that the above exemplary embodiment describes, as an example, a case in which the withdrawing member 50 is attached to the locking member 42 so as to be able to rotate and move coaxially therewith. However, the withdrawing member may be attached to the locking member in a state in which another form of relative movement is possible such as, for example, the withdrawing member is attached to the locking member so as to be able to move rectilinearly, and moves rectilinearly between a position on the path of the transmission operation movement and a position off of the path of the transmission operation movement, or the like.

Further, as an example, the above exemplary embodiment describes a case in which the biasing member is the torsion spring 58. However, the biasing member may be another biasing member such as a tension coil spring, a compression coil spring, a plate spring, or the like. It suffices for the biasing member to be a biasing member which, in the state in which the locking member is movable and the shift lever is moved so as to operate the transmission, causes the locking member to interlock with the withdrawing member and withdraw from the path of the transmission operation movement of the shift lever.

What is claimed is:

1. A shift lever device for transmission operation of a vehicle, comprising:
   a shift lever which can change a shift position;
   a locking member switched, by operation of a vehicle occupant, between a movable state and a movement limited state, and, in the movement limited state, the locking member is disposed at an impeding position at which the locking member impedes transmission operation movement of the shift lever;
   a withdrawing member attached to the locking member so as to be able to move relative thereto, the withdrawing member being pushed by the transmission operation movement of the shift lever, and, due to a component of force thereof, being withdrawn from a path of the transmission operation movement of the shift lever; and
   a biasing member provided between the locking member and the withdrawing member, and, in a state in which the locking member is in the movable state and the shift lever is moved for transmission operation, the biasing member interlocks the locking member with the withdrawing member and causes the locking member to withdraw from the path of the transmission operation movement of the shift lever.

2. The shift lever device of claim 1, wherein the withdrawing member is attached to the locking member so as to be able to rotate and move coaxially.

3. The shift lever device of claim 1, wherein the biasing member is supported at the locking member, and urges the withdrawing member in an opposite direction of a direction in which the withdrawing member is withdrawn from a path of movement for transmission operation of the shift lever.

4. The shift lever device of claim 1, wherein the biasing member includes a torsion spring.

5. The shift lever device of claim 1, wherein the withdrawing member has an inclined surface which is pushed by transmission operation of the shift lever.

6. The shift lever device of claim 1, wherein, in a state in which the shift lever is at a "P" shift position, a portion of the withdrawing member is disposed on a path of movement for transmission operation of the shift lever.

7. The shift lever device of claim 1, wherein the movable state is determined by operational states of an ignition key and a brake of the vehicle.

8. The shift lever device of claim 1, wherein the withdrawing member is attached to the locking member so as to be able to rotate and move coaxially, and the biasing member is supported at the locking member and urges the withdrawing member in an opposite direction of a direction in which the withdrawing member is withdrawn from a path of movement for transmission operation of the shift lever, and, in a state in which the shift lever is at a "P" shift position, a portion of the withdrawing member is disposed on the path of movement for transmission operation of the shift lever.

* * * * *